(12) United States Patent
Smith

(10) Patent No.: US 9,765,640 B2
(45) Date of Patent: Sep. 19, 2017

(54) SYSTEM AND METHOD TO MANAGE TRANSIENTS FOR RAPID POWER DEMAND CHANGES

(71) Applicant: Rolls-Royce Corporation, Indianapolis, IN (US)

(72) Inventor: Alan W. Smith, Columbus, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 296 days.

(21) Appl. No.: 14/722,339

(22) Filed: May 27, 2015

(65) Prior Publication Data
US 2016/0160682 A1 Jun. 9, 2016

Related U.S. Application Data

(60) Provisional application No. 62/004,534, filed on May 29, 2014.

(51) Int. Cl.
*F02C 6/00* (2006.01)
*F01D 25/02* (2006.01)
(Continued)

(52) U.S. Cl.
CPC ............ *F01D 25/02* (2013.01); *F01D 15/10* (2013.01); *F02C 3/04* (2013.01); *F02C 7/047* (2013.01); *H02P 9/008* (2013.01); *F05D 2220/32* (2013.01); *F05D 2220/76* (2013.01); *F05D 2270/00* (2013.01)

(58) Field of Classification Search
CPC .. H02P 9/008; F05D 2270/00; F05D 2220/76; F05D 2220/32; F02C 7/047; F02C 3/04; F01D 15/10

USPC ............ 290/40 R, 52; 60/772, 782, 39.093; 307/9.1
See application file for complete search history.

(56) References Cited

U.S. PATENT DOCUMENTS

| | | | | |
|---|---|---|---|---|
| 4,741,152 | A | * | 5/1988 | Burr ........................ F01D 25/18 60/39.08 |
| 4,773,212 | A | * | 9/1988 | Griffin .................... F02C 7/224 60/226.1 |

(Continued)

FOREIGN PATENT DOCUMENTS

| | | |
|---|---|---|
| DE | 1803419 A1 | 6/1969 |
| EP | 1405986 A2 | 4/2004 |

(Continued)

*Primary Examiner* — Julio C. Gonzalez R.
(74) *Attorney, Agent, or Firm* — Fishman Stewart PLLC

(57) ABSTRACT

An exemplary system may include a gas turbine engine configured to operate at an engine power level to satisfy an engine power demand. The system may also include at least one generator operatively coupled to the engine and configured to generate electrical power based at least in part on the engine power demand. The system further may include at least one heating element in communication with the at least one generator, and at least one control unit coupled to the at least one heating element. The at least one heating element may be configured to receive electrical power from the at least one generator to generate thermal energy. The at least one control unit may be configured to energize the heating element when the engine power demand is below the engine power level and/or there is an anticipated increase in the engine power demand.

19 Claims, 4 Drawing Sheets

(51) Int. Cl.
*F01D 15/10* (2006.01)
*F02C 7/047* (2006.01)
*F02C 3/04* (2006.01)
*H02P 9/00* (2006.01)

(56) References Cited

U.S. PATENT DOCUMENTS

| | | | | |
|---|---|---|---|---|
| 4,782,658 A * | 11/1988 | Perry | ............ | F02C 7/047 60/226.1 |
| 5,114,100 A * | 5/1992 | Rudolph | ............ | B64C 21/06 244/130 |
| 5,131,812 A | 7/1992 | Boyd et al. | | |
| 5,353,370 A | 10/1994 | Kim et al. | | |
| 6,725,645 B1 * | 4/2004 | Wadia | ............ | F01D 25/02 29/890.1 |
| 7,690,186 B2 * | 4/2010 | Dooley | ............ | F01D 15/10 60/39.511 |
| 7,854,582 B2 * | 12/2010 | Ullyott | ............ | F01D 21/06 415/1 |
| 7,936,082 B2 | 5/2011 | Boudyaf et al. | | |
| 8,631,655 B2 * | 1/2014 | Dooley | ............ | F01D 15/10 60/266 |
| 2004/0065092 A1 * | 4/2004 | Wadia | ............ | F01D 25/02 60/778 |
| 2007/0101696 A1 * | 5/2007 | Dooley | ............ | F01D 15/10 60/203.1 |
| 2010/0155538 A1 * | 6/2010 | Calder | ............ | B64D 15/12 244/134 D |
| 2010/0162719 A1 * | 7/2010 | Bowman | ............ | F02C 7/32 60/773 |
| 2010/0162720 A1 * | 7/2010 | Bowman | ............ | F02C 7/32 60/773 |
| 2010/0326041 A1 * | 12/2010 | Edmondson | ............ | F01D 9/041 60/39.093 |
| 2011/0154805 A1 | 6/2011 | Heathco et al. | | |
| 2011/0162340 A1 | 7/2011 | Valleroy et al. | | |
| 2011/0277443 A1 | 11/2011 | Pereira et al. | | |
| 2013/0076120 A1 * | 3/2013 | Wagner | ............ | B64D 33/00 307/9.1 |
| 2013/0219916 A1 | 8/2013 | Desai et al. | | |
| 2016/0061056 A1 * | 3/2016 | Appukuttan | ............ | F01D 25/10 415/144 |

FOREIGN PATENT DOCUMENTS

| | | |
|---|---|---|
| EP | 1785617 A1 | 5/2007 |
| EP | 1990506 A2 | 11/2008 |

* cited by examiner

SYSTEM AND METHOD TO MANAGE TRANSIENTS FOR RAPID POWER DEMAND CHANGES

CROSS-REFERENCE TO RELATED APPLICATIONS

This application claims priority to U.S. Provisional Patent Application No. 62/004,534 filed May 29, 2014, the contents of which are hereby incorporated in their entirety.

FIELD OF TECHNOLOGY

The present disclosure generally relates to a system and a method for managing engine transients for rapid power demand changes, such as during engine loading and unloading.

BACKGROUND

Gas turbine engines may be used to supply power in various types of vehicles and systems, including, but not limited to, aircraft, naval propulsion, and the like. A gas turbine engine generally includes a compressor section, a combustor section, and a turbine section. The compressor section receives and compresses a flow of intake air. The compressed air then enters the combustor section in which a steady stream of fuel is injected, mixed with the compressed air, and ignited, resulting in high energy combustion gas, which is then directed to the turbine section. In the turbine section, the combustion gas causes turbine blades to rotate and generate energy, from which electrical power may be extracted via an electrical generator coupled mechanically or hydraulically to the gas turbine engine. The electrical power may be used by various loads within the vehicle or system, such as control systems, actuators, climate control systems, and the like.

In some situations, an electrical, hydraulic, or mechanical load may suddenly be removed, thereby reducing engine power demand, such that the gas turbine engine may be generating excess engine power. This in turn may result in rapid and undesirable acceleration of the gas turbine engine. In other situations, it may be desirable to go from a low power setting to one of instant high power, thereby increasing engine power demand. However, the gas turbine engine may require several seconds to achieve this state. At or near idle speeds, the gas turbine engine may be near the compressor surge line, and as such may need to be managed accordingly. This in turn affects the ability for the gas turbine engine to have a quick response.

Therefore, there exists a need for a system and method to manage engine transients when there is a rapid change in engine power demand, such as during engine loading and unloading, in an efficient and cost-effective manner.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Gas turbine engines used in vehicles, such as aircraft, may experience transient loading and unloading conditions that may need to be managed. An exemplary system for managing engine transients may include a gas turbine engine having at least one compressor section configured to receive an inlet air stream, and at least one turbine section mounted on at least one spool. The gas turbine engine may be configured to operate at an engine power level to satisfy an engine power demand. The exemplary system may also include at least one generator operatively coupled to the gas turbine engine. The at least one generator may be configured to generate electrical power based at least in part on the engine power demand. The system further may include at least one heating element in communication with the at least one generator, and at least one control unit coupled to the at least one heating element. The at least one heating element may be configured to receive electrical power from the at least one generator to generate thermal energy. The at least one control unit may be configured to energize the at least one heating element if a first condition and/or a second condition exists. The first condition may include the engine power demand dropping below the engine power level, and the second condition may include an anticipated increase in the engine power demand. The at least one heating element may be located upstream of the at least one compressor section, such as in an inlet duct of the gas turbine engine, such that the thermal energy may be transferred to the inlet air stream.

An exemplary method of managing the engine transients may include first commanding the gas turbine engine and the generator to operate at an optimum speed for a current power setpoint. The method then may include determining if the first condition and/or the second condition exists. If so, the method then may include energizing the at least one heating element to convert at least a portion of the electrical power into thermal energy to exchange heat with an inlet air stream into the gas turbine engine.

Figure 1:
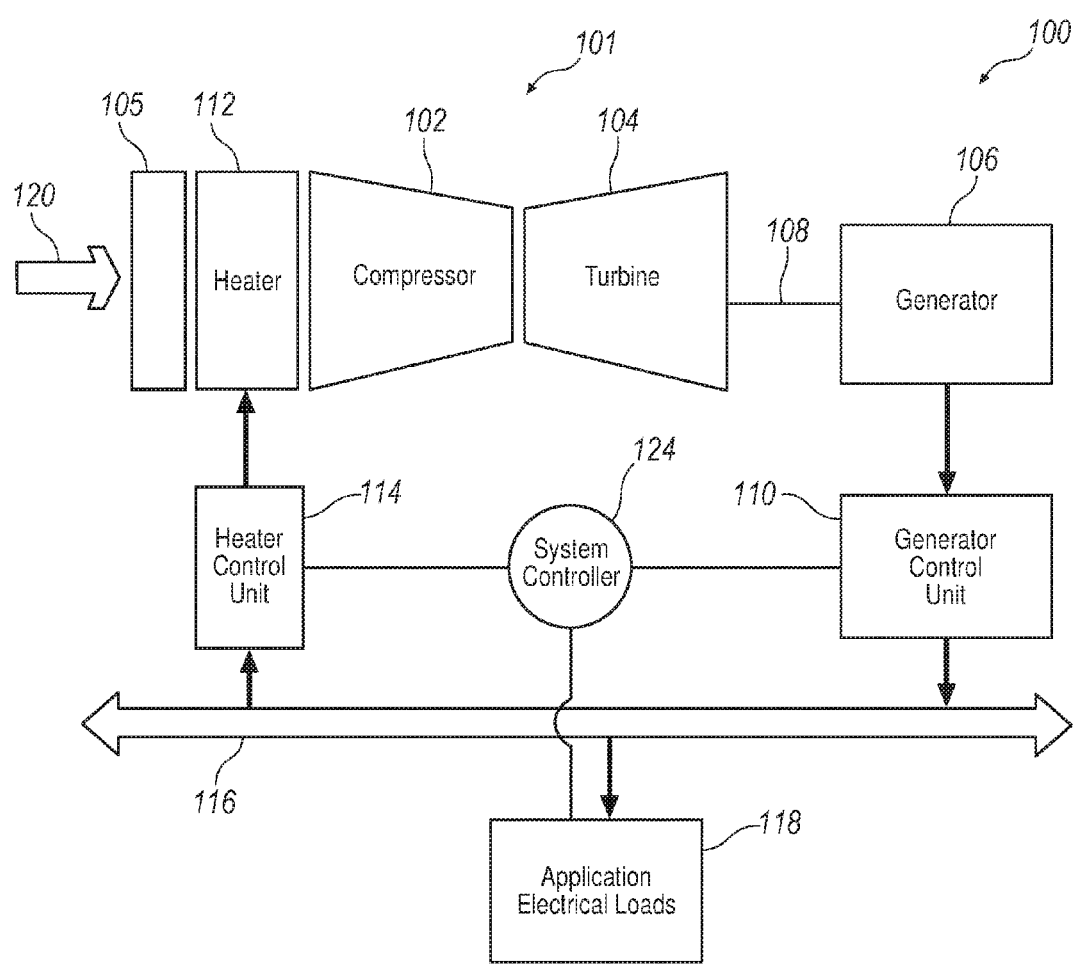
FIG. 1 illustrates a schematic block diagram of an exemplary system for managing engine transients.
Figure 2:
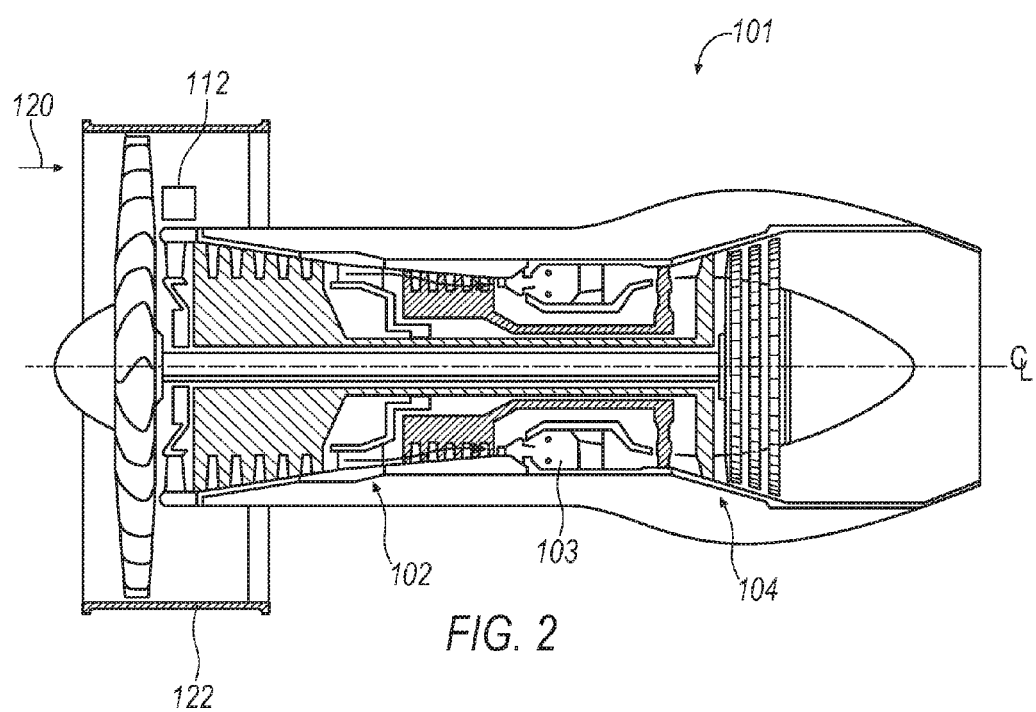
FIG. 2 illustrates an exemplary gas turbine engine of the system of FIG. 1.

Referring now to the figures, an exemplary system 100 for a vehicle or system, such as an aircraft, is shown in FIG. 1. The system 100 may include a gas turbine engine 101, as depicted in FIG. 2. While the gas turbine engine 101 is depicted in FIG. 2 as a turbofan, it should be appreciated that it may be, but is not limited to, a turbofan, a turboshaft, or a turboprop. The gas turbine engine 101 generally may include a compressor section 102 and a turbine section 104 mounted on a common shaft or spool. As seen in FIG. 2, the gas turbine engine 101 may be a multi-spool engine having low pressure (LP) and high pressure (HP) compressors and/or turbines. However, it should be appreciated that the gas turbine engine 101 may be a single spool engine. The compressor section 102 generally may be configured to receive and compress an inlet air stream 120. The compressed air may then be mixed with a steady stream of fuel and ignited in a combustor section 103. The resulting combustion gas may then enter the turbine section 104 in which the combustion gas causes turbine blades to rotate and generate energy.

The system 100 may also include a generator 106 coupled to the spool of the gas turbine engine 101 via a shaft 108, and a generator control unit 110 coupled to the generator 106. Where the gas turbine engine 101 is a multi-spool, the generator 106 may be coupled to any one of the spools, for example a LP spool such that the generator 106 may be a LP generator. The generator 106 generally may be an electrical generator configured to extract energy from the gas turbine engine 101 and generate electrical power. The electrical power may then be used by one or more application electrical loads 118 within the vehicle. The application electrical loads 118 may include, but are not limited to, control systems, actuators, climate control systems, and the like.

The generator control unit 110 may be configured to control the operation of the generator 106, and to communicate with other system components, such as the application electrical loads 118. For example, the generator control unit 110 may command the generator 106 to distribute electrical power to the application electrical loads 118 via a power bus 116.

The system 100 may further include a heater 112 and a heater control unit 114 coupled to the heater 112. The heater 112 generally may be any electrically operated heating element or circuit configured to receive electrical power to generate thermal energy, including, but not limited to, a heater pad. The heater 112 generally may have a steady state power limit and a transient power limit. While only one heater 112 is shown, it should be appreciated that there may be any number of heaters 112, where each heater 112 may be coupled to a separate heater control unit 114, or multiple heaters 112 may be coupled to at least one heater control unit 114. The heater 112 may be located upstream of the compressor 102 such that it may provide the thermal energy to the inlet air stream 120, i.e., heat the inlet air stream 120. In one exemplary approach, the heater 112 may be located in an inlet duct 122 of the gas turbine engine 101. In another exemplary approach in which the gas turbine engine 101 is a turboprop having a propeller 105, the heater 112 may be located in or around the propeller. It should be appreciated that the heater 112 may be located anywhere within the gas turbine engine 101 or the vehicle that thermal energy may be required or desirable, not just upstream of the compressor section 102. For example, vehicles often include anti-icing or de-icing systems and/or circuits at various locations where ice buildup is undesirable, such as at the engine inlet, the wings of an aircraft, etc. Such existing systems may be utilized as the heater 112, which would eliminate the need to install additional equipment, thereby saving costs to implement the system 100. Furthermore, the heater 112 may be used in lieu of or in addition to batteries, capacitance banks, flywheels, or the like to store excess electrical energy generated by the generator 106, as described in more detail hereinafter.

The heater control unit 114 generally may be configured to control the operation of the heater 112. The heater control unit 114 may be in communication with the generator control unit 110 and/or the power bus 116 such that electrical power may be supplied from the generator 106 to the heater 112 when required, such as for engine transient conditions. For example, one or more of the application electrical loads 118 may be suddenly removed, thereby reducing the engine power demand from the gas turbine engine 101. However, the gas turbine engine 101 may not adjust its power output quickly enough to counter the load removal, thereby resulting in excess power, i.e., the engine power is greater than the engine power demand. As such, it may be desirable to transfer the excess power to another load, i.e., the heater 112, to prevent the gas turbine engine 101 from rapidly accelerating. In such situations, the heater control unit 114 may energize the heater 112 such that the excess power may be transferred to the inlet air stream 120 via electrical heat to help maintain engine loading and reduce engine speed increases, thereby helping the engine decelerate. The energy may be reclaimed by the gas turbine engine 101 for the period during and after the electrical heat is applied. Due to the relatively long time constant (slow response) of the heating system, the reabsorption of heat by the gas turbine engine 101 may occur after the fuel has been reduced and the gas turbine engine 101 is decelerating or is at a low power condition.

In another exemplary situation, it may be desirable to increase the engine loading or power demand transiently or to rapidly increase the gas turbine engine 101 from idle to full power, i.e., within a predetermined time frame. In such a scenario, the gas turbine engine 101 may be a multi-spool engine having a LP spool and a HP spool, where the generator 106 is coupled to the LP spool, as mentioned above. When such a power demand is anticipated, the heater control unit 114 may energize the heater 112 to increase the electrical power generated by the generator 106 and generator loading on the LP spool, thereby resulting in an increase in HP speed and fueling. As the power demand increase occurs, the heater control unit 114 may turn off the heater 112 in order to reduce the engine power if the power demand exceeds the power available from the gas turbine engine 101. The added electrical heat introduced at the engine inlet by the heater 112 may be at least partially recovered by the gas turbine engine 101 to assist the HP speed to accelerate. For a dual or triple spool engine, if the engine is being controlled to LP spool speed at low power, then the HP idle speed will increase when the heater 112 is switched on to provide the benefit of higher engine power and higher HP speed with the onset of the higher power demand.

When it is known when the anticipated engine power demand increase is going to occur, the heater control unit 114 may energize the heater 112 at a predetermined time frame, for example five seconds, before the engine power demand actually increases. During this time frame, the heater 112 may be allowed to exceed its steady state limits transiently. However, if power demand increase is impending but the exact timing is unknown, the heater 112 may be energized for a longer period of time, where the heater 112 may not exceed its steady state limit.

There are several benefits to utilizing the heater 112 in the conditions described above. First, turning the heater 112 on when there is an anticipated power increase raises the power output of the gas turbine engine 101 such that when the rapid load increase actually occurs the gas turbine engine 101 is already outputting more power to absorb it. Second, this may reduce acceleration time (time to output maximum power) of the gas turbine engine 101, since the engine HP spool speed is raised from where it would otherwise be if the heater 112 had been left off and the engine power remained low. Gas turbine engines typically accelerate much faster if the initial power condition is higher. This is because the engine HP spool speed is already elevated, and the compressor surge line usually increases significantly as engine power (HP speed) increases when at relatively low engine power states. Therefore, the engine can take a much larger fuel rate increase and therefore sustain a faster acceleration without problems. Third, the previously generated heat from the inlet may be released during the engine acceleration such that the heat energy is partially re-absorbed into the engine to temporarily boost the inlet energy to assist the acceleration.

Also, when it is anticipated that an increase in power demand will occur, then the engine speed driving the generator 106 may be raised to the maximum speed limit for low power operation of the generator 106 and the gas turbine engine 101. This may store additional rotational kinetic energy in the system 100 that may be absorbed as the generator and engine speed droops when the engine power increase occurs.

Installation of the heater 112 and/or the static structure of the gas turbine engine 101 at the engine inlet may be designed to have significant heat capacity to allow the release of electrical heat to the inlet air stream 120 to occur over an extended period of time after the heater 112 has been switched off, such as when the gas turbine engine 101 is no longer generating excess power. For example, multiple heaters 112 may be located at various locations at the engine inlet and staged in operation. Alternatively or in addition, the gas turbine engine 101 at the inlet, for example the inlet duct 122, may be made of a material having a high heat capacity above a predetermined threshold, and/or may be a relatively large structure such that there may be a large available area for heat transfer to the inlet air stream 120 to occur. This may help reduce the peak temperature of the heater 112, increase the specific heat capacity to allow larger amounts of heat to be absorbed, and allow a larger heat flow to the inlet air stream 120. In icing conditions, this may allow the heater 112 to be switched off when the application electrical loads 118 are applied to reduce the peak electrical power off take. This may also help to minimize the variation in electrical load and therefore loading of the generator 106 that may occur due to electrical power transients and drop-outs that may occur, as explained above.

The system 100 may include a system controller 124 in communication with the gas turbine engine 101, the generator control unit 110, the heater control unit 114, and/or the application electrical loads 118. The system controller 124 may determine when a condition exists, and direct the generator control unit 110 and/or the heater control unit 114 to control the operation of the generator 106 and the heater 112, respectively. By way of example only, the condition may be where the engine power demand drops below the engine power, such as when one of the application electrical loads 118 and/or a mechanical or hydraulic load is removed. Another condition may be when an increase in the engine power demand is anticipated or requested, such as when the gas turbine engine 101 accelerates from an idle speed within a predetermined time frame.

It should be appreciated that the system of dissipating and storing electrical heat energy and rotational kinetic energy may also be applied to rapidly changing hydraulic or mechanical loads to the system that occur faster than the gas turbine engine 101 may respond. It should further be appreciated that this system may be applied for cases in which the generator 106 is driven by a hydraulic motor powered by an engine driven hydraulic pump.

Computing devices, such as the generator control unit 110 and the heater control unit 114, generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3A:
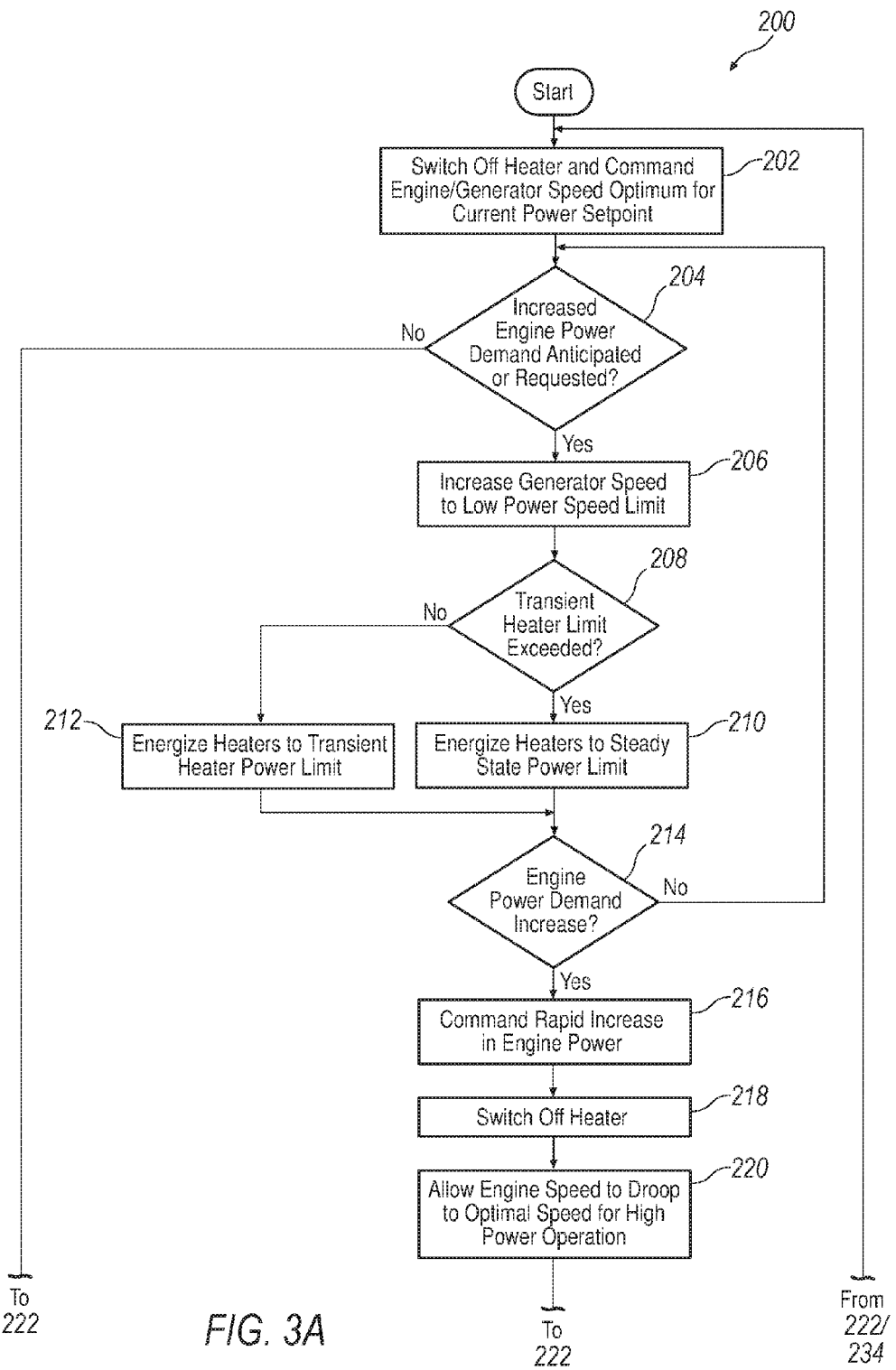
FIGS. 3A and 3B illustrate an exemplary method for managing engine transients.
Figure 3B:
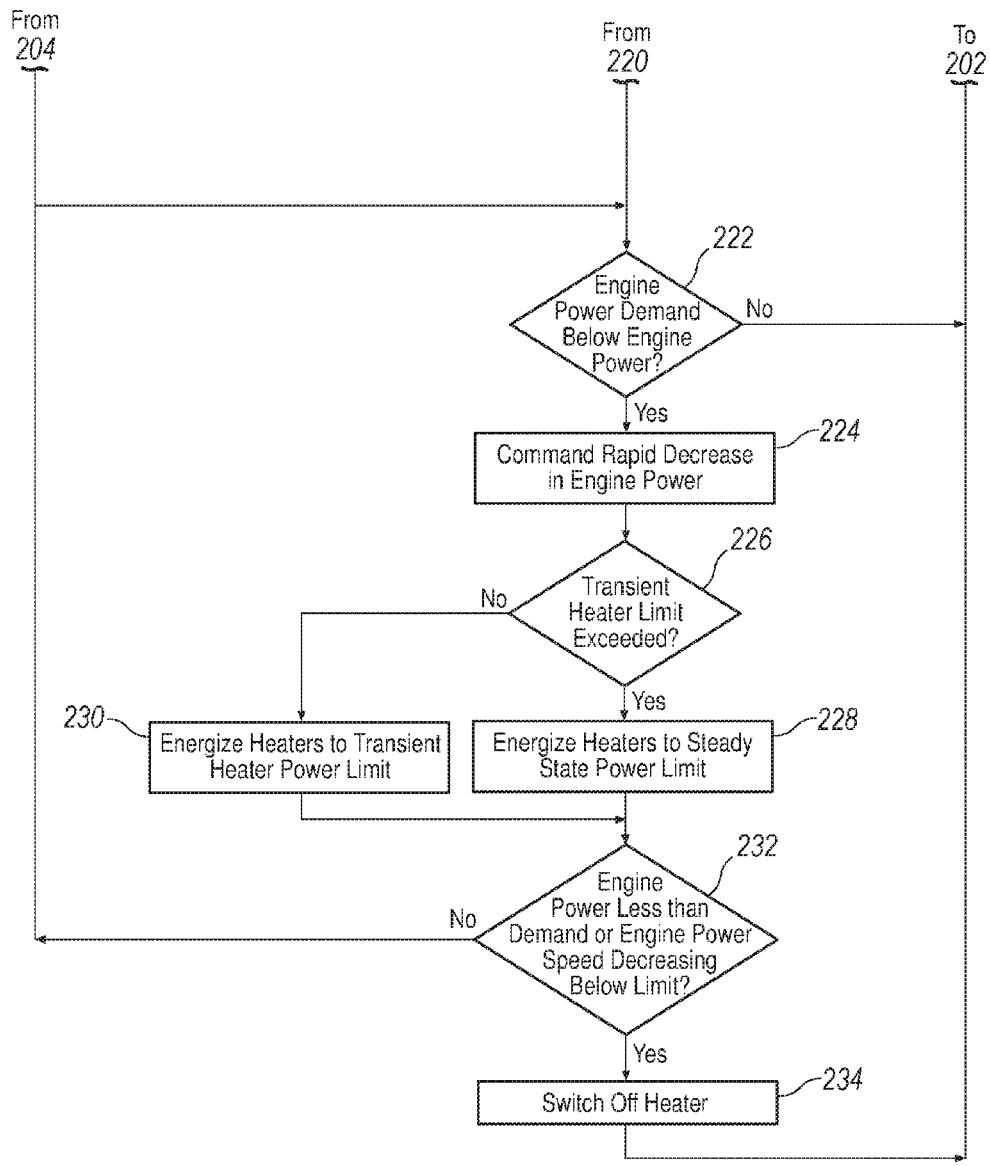

Referring now to FIGS. 3A and 3B, an exemplary method 200 for managing speeds of the gas turbine engine 101 during engine transient conditions is shown. Method 200 begins at block 202 at which the heater 112 may be switched off if it is on, and the gas turbine engine 101 and the generator 106 may be commanded, for example by the system controller 124, to operate at optimum speed for a current power setpoint. At block 204, method 200 may include determining, if an increased engine power demand is anticipated or requested. If no, then block 204 may proceed to block 222. If yes, then method 200 may proceed to block 206 at which the speed of the generator 106 may be increased to a low power generator/engine speed limit. At block 208, method 200 may then include determining if a transient heater limit is exceeded. If no, such as when the heater 112 is turned off, method 200 may proceed to block 212 at which the heater 112 may be energized to the transient heater power limit. If yes, then method 200 may proceed to block 210 at which the heater 112 may be energized to a steady state power limit. After either block 210 or 212, method 200 may proceed to block 214 at which it may be determined whether there has been an actual engine power demand increase. If no, method 200 may go back to block 204. If yes, then method 200 may proceed to blocks 216 through 220 at which the gas turbine engine 101 may be commanded to rapidly increase in power, the heater 112 may be switched off, and the engine speed may be allowed to droop to optimal speed for high power operation.

At block 222, method 200 may include determining if the engine power demand is below the engine power, for example if any of the application electrical loads 118 have been removed. If no, method 200 may go back to block 202 to repeat method 200 until one of the conditions from blocks 204 and 222 are present. Alternatively, method 200 may end. If yes, method 200 may proceed to block 224 at which the engine 101 may be commanded to rapidly decrease in engine power. At block 226, method 200 may then include determining if a transient heater limit is exceeded. If no, such as when the heater 112 is turned off, method 200 may proceed to block 230 at which the heater 112 may be energized to the transient heater power limit. If yes, then method 200 may proceed to block 228 at which the heater 112 may be energized to a steady state power limit. After either block 228 or 230, method 200 may proceed to block 232 at which it may be determined if the engine power is less than the engine power demand or if the engine speed is decreasing and is below an engine speed transient limit. If either one of these conditions is present, method 200 may proceed to block 234 at which the heater 112 may be switched off. If neither one is present, method 200 may go back to block 222. After block 234, method 200 may go back to block 202 to repeat itself, or alternatively, method 200 may end.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
   a gas turbine engine having at least one compressor section and at least one turbine section mounted on at least one spool, the at least one compressor section being configured to receive an inlet air stream, the gas turbine engine being configured to operate at an engine power level to satisfy an engine power demand;
   at least one generator operatively coupled to the gas turbine engine, the at least one generator being configured to generate electrical power based at least in part on the engine power demand;
   at least one heating element in communication with the at least one generator, the at least one heating element being configured to receive electrical power from the at least one generator and generate thermal energy; and
   at least one control unit coupled to the at least one heating element, the at least one control unit being configured to energize the at least one heating element during at least one condition of an anticipated increase in the engine power demand;
   wherein energizing the at least one heating element occurs a predetermined time frame prior to an actual increase in the engine power demand when the at least one condition exists.

2. The system of claim 1, wherein the gas turbine engine is one of a turboshaft, a turboprop, and a turbofan.

3. The system of claim 2, wherein the gas turbine engine is a turboprop having a propeller, and the at least one heating element is located at the propeller.

4. The system of claim 1, wherein the at least one heating element is located upstream of the at least one compressor section such that the at least one heating element transfers the thermal energy to the inlet air stream.

5. The system of claim 4, wherein the gas turbine engine has an inlet duct through which the inlet air stream is drawn into the gas turbine engine, the at least one heating element being located within the inlet duct.

6. The system of claim 5, wherein at least a portion of the inlet duct is made of a material having a heat capacity above a predetermined threshold.

7. The system of claim 1, wherein the at least one heating element has a steady state power limit and a transient power limit, and the at least one control unit is configured to energize the at least one heating element to a steady state power limit when the transient heater limit is exceeded, and to energize the at least one heating element to the transient power limit when the transient power limit is not exceeded.

8. The system of claim 1, wherein the at least one heating element is an electrical heating pad.

9. The system of claim 1, wherein the at least one heating element is a de-icing circuit.

10. The system of claim 1, wherein the electrical generator is hydraulically powered by a hydraulic pump that is mechanically driven by the gas turbine engine.

11. A method comprising:
    commanding a gas turbine engine and a generator operatively coupled to the gas turbine engine to operate at an optimum speed for a current power setpoint, the gas turbine engine operating at an engine power level to satisfy an engine power demand, and the generator generating electrical power based at least in part on the engine power demand;

determining if one of a first condition and a second condition exists, wherein the first condition includes the engine power demand dropping below the engine power level, and the second condition includes an anticipated increase in the engine power demand;

if one of the first condition and the second condition exists, then energizing at least one heating element to convert at least a portion of the electrical power into thermal energy to exchange heat with an inlet air stream into the gas turbine engine;

wherein energizing the at least one heating element occurs a predetermined time frame prior to an actual increase in the engine power demand when the second condition exists.

12. The method of claim 11, wherein the anticipated increase in the engine power demand actually occurs when the gas turbine engine accelerates from an idle speed within a predetermined time frame.

13. The method of claim 11, wherein energizing the at least one heating element does not exceed a transient limit of the at least one heating element when the second condition exists and a time frame until the anticipated increase in engine power demand is to occur is unknown.

14. The method of claim 11, further comprising, when the first condition exists, turning off the at least one heating element when one of the engine power is less than the engine power demand and the engine power speed is decreasing below an engine speed limit occurs.

15. The method of claim 11, further comprising, when the second condition exists, turning off the at least one heating element when the anticipated increase in the engine power demand actually occurs.

16. The method of claim 11, further comprising increasing speed of the generator and the gas turbine engine to a maximum speed limit at a low power operation.

17. A system comprising:

a gas turbine engine having an inlet duct through which an inlet air stream enters the gas turbine engine, the gas turbine engine being configured to operate at an engine power level to satisfy an engine power demand;

at least one generator operatively coupled to the gas turbine engine via a shaft, the at least one generator being configured to generate electrical power based at least in part on the engine power demand;

at least one heating element located within the inlet duct of the gas turbine engine and in communication with the at least one generator, the at least one heating element being configured to receive electrical power from the at least one generator and generate thermal energy; and at least one control unit coupled to the at least one heating element, the at least one control unit being configured to energize the at least one heating element when there exists an anticipated increase in the engine power demand;

wherein energizing the at least one heating element occurs a predetermined period prior to an actual increase in the engine power demand.

18. The system of claim 17, wherein at least a portion of the inlet duct is made of a material having a heat capacity above a predetermined threshold.

19. The system of claim 17, wherein the at least one heating element is a de-icing circuit.

* * * * *